INVENTOR
NILS O. ROSAEN

United States Patent Office 3,493,113
Patented Feb. 3, 1970

3,493,113
DUAL CLEAN FILTER WITH FLUID CYLINDER ROTATING MEANS
Nils O. Rosaen, Bloomfield Hills, Mich., assignor of one-half to Borje O. Rosaen, Ann Arbor, Mich.
Continuation-in-part of application Ser. No. 539,863, Apr. 4, 1966. This application Nov. 29, 1968, Ser. No. 779,981
Int. Cl. B01d 35/16
U.S. Cl. 210—108
22 Claims

ABSTRACT OF THE DISCLOSURE

A self-cleaning filter device is disclosed in which a partition member supporting a pair of filter elements is rotatably supported in a filter chamber for motion between a pair of positions 180° apart. In each of the two positions the partition subdivides the chamber into a pair of subchambers with a filter element being disposed in each sub-chamber. One element is positioned to collect foreign matter from fluid flowing through one of the subchambers, and the other is positioned in a backwash position in the other subchamber for the removal of foreign matter collected in the first subchamber. A fluid cylinder is connected to the partition member and to a valve supported in a sediment outlet in the backwash subchamber and is operative upon being pneumatically actuated to rotate the partition to exchange the two filter elements when the filtering element becomes clogged, and to open the valve to allow the removal of sediment from the backwash subchamber.

Cross-reference to related application

This application is a continuation-in-part of application Ser. No. 539,863 filed Apr. 4, 1966 now Patent No. 3,325,557.

Background of the invention

This invention relates to self-cleaning filter devices and more specifically to such a device having at least a pair of separated chambers, a filter element in each chamber, means for delivering a fluid to be filtered into a first chamber for the removal of foreign matter by one of the filter elements, means for automatically exchanging the filter elements in the first and second chambers as the element in the first chamber becomes clogged, and means for introducing a backwash fluid into the second chamber to remove collected foreign matter from the clogged filter element.

In my aforementioned patent, a novel self-cleaning filter device was disclosed which when incorporated in a fluid system allows the system to operate continuously while a clogged filter element in the system is exchanged with a clean element. The structure that permits this uninterrupted exchange includes a filter housing having an internal chamber provided with sidewalls that form a portion of a cylinder. A partition member is supported in the chamber for motion between a pair of rotated positions 180° apart in each of which it subdivides the chamber into a pair of subchambers. A pair of filter elements are mounted on the partition member, one on each side so that in each rotated position one of the filter elements is disposed in each subchamber.

The housing has an inlet and an outlet for passing the system fluid through one of the subchambers which will be referred to as the filtering subchamber. As the fluid flows through the filtering subchamber, it passes through the filter element disposed therein so that foreign matter carried in the fluid is collected by the filter element. The housing also has a pressure chamber which is connected with the second subchamber and which will be referred to as the backflush subchamber. Means are disposed in the pressure chamber to produce a fluid pressure surge in a reverse direction through the filter element disposed in the backflush subchamber in order to clean it.

The partition member is supported on a motor drive shaft arranged to rotate the partition member 180° in order to exchange the positions of the two filter elements in their respective subchambers at such times as the filter element in the filtering subchamber is clogged. This exchange is automatically performed by means of a pressure-responsive piston which senses the changing pressure drop across the filter element as it collects a cake of sediment. The piston moves as the pressure drop changes to a position in which it energizes a motor to rotate the partition and to initiate a backflush cycle when the clogged element has been rotated into the backflush subchamber.

The broad purpose of the present invention is to disclose several improvements over the filter device of my co-pending patent application.

Summary

The preferred embodiment of the present invention, which will be subsequently described in greater detail, is similar to the aforementioned device with respect to the arrangement of the partition and the manner in which the filter elements are supported on the partition as it is rotated between its alternate positions in the housing. However a much simpler drive means is employed for rotating the partition. This improved drive means comprises a pneumatic cylinder having an extendable rod linked to the shaft that supports the partition so that when the rod is extended, the partition is rotated in one direction, and when the rod is retracted the partition is rotated in the opposite direction. The rod of the pneumatic cylinder is also connected to a slide valve which opens and closes an outlet to a sediment chamber in the backflush subchamber so that as the two filter elements are being exchanged, the sludge deposit which accumulates in the backflush chamber is removed from the system.

The means for producing the pressure surge that backflushes the filter element in the backflush chamber, comprises a pneumatic circuit connected to an air-actuated piston which is supported for motion in the pressure chamber.

Clean fluid is introduced in the front side of the piston and a pneumatic connection is opened on its back side at suitable intervals to move the piston so that it produces a fluid pressure wave from the pressure chamber through the filter element in the backflush chamber.

A pressure-responsive piston in the filter housing senses the condition of the filter element in the filtering subchamber as reflected in the pressure differential across the filter element. The pressure-responsive piston is arranged to operate valve means between a source of pneumatic pressure and the pneumatic circuit to energize the backflush piston and also the drive piston when the filter element becomes clogged so that the cleaning cycle is controlled by a pneumatic system as opposed to the electrical system of the device disclosed in my aforementioned copending application.

The preferred embodiment also has flange means for mounting the filter housing on the fluid reservoir of the fluid system as opposed to the floor mounted system of my aforementioned patent. Thus it can be seen that the preferred embodiment of my present invention increases the areas of application of the basic self-cleaning filter construction of my aforementioned patent by disclosing a device employing a pneumatic control system, a pneumatically operated actuator for rotating the partition member between its alternate positions, and an improved arrangement for removing sediment from the backflush subchamber.

Still other advantages of the present invention will readily occur to those skilled in the art to which the invention pertains upon reference to the following detailed description.

Description of the drawings

The description refers to the accompanying drawings in which like reference characters refer to like parts throughout the several views and in which.

Description of the preferred embodiment

Figures 1, 2:
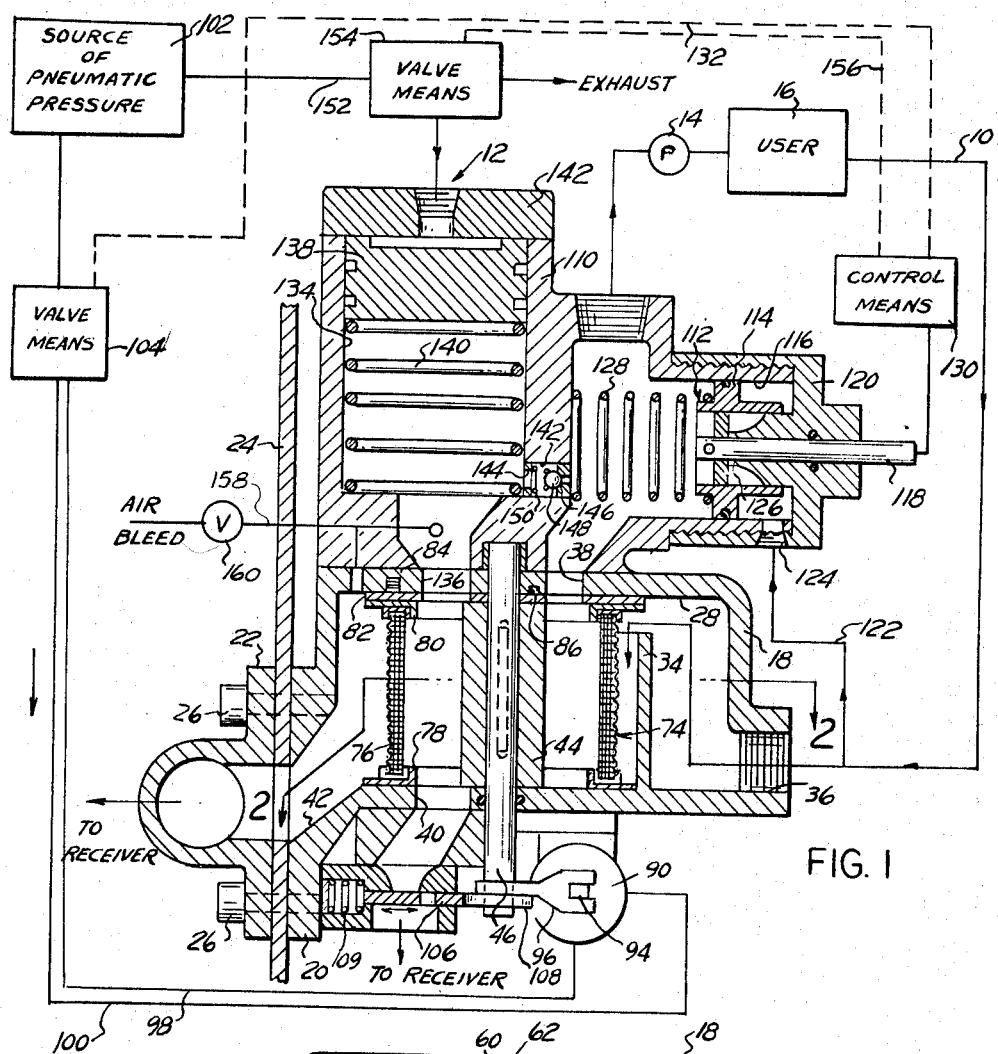
FIGURE 1 is a longitudinal sectional view through a filter device illustrating the preferred embodiment of the invention in a hydraulic system which is schematically illustrated for purposes of description.
FIGURE 2 is a section through the filter chamber as seen along lines 2—2 of FIGURE 1.

Now referring to FIGURE 1, a fluid system is illustrated as comprising a fluid circuit 10 for cycling a fluid from a filter device generally indicated at 12 through a pump 14 and a fluid user 16. Such a fluid may be employed, as a cooling agent for a machine tool. The pump 14 provides means for moving the fluid through the system. The filter device 12 provides means for removing foreign matter that is introduced into the system as the fluid travels through the circuit 10.

The filter device 12 comprises a lower housing member 18 having a flange 20 along one of its sides which cooperates with a member 22 for mounting the device on a wall 24 of a fluid reservoir by means of fastener means 26. Referring to FIGURE 2, the lower housing member 18 is formed with an internal chamber 28 having a pair of chamber walls 30 and 32 on opposite sides of the chamber 28 with opposed, cylindrical surfaces formed about a common cylindrical axis. The chamber walls 30 and 32 extend the full height of the chamber 28 and are connected by a partition or wall 34 which extends only a portion of the height of the chamber 28. The lower housing member 18 is also formed with an inlet 36 for receiving fluid to be filtered into the chamber 28 a first outlet 38 for the removal of filtered fluid from the chamber 28, a second outlet 40 and a third outlet 42.

A partition member 44, keyed to the shaft 46, is disposed in the chamber 28 for rotation between a pair of rotated positions approximately 180° apart. Vane means 48 and 50 are carried along the side edge of the partition member 44, and engage the walls 30 and 32 in each of the rotated positions of the partition member to subdivide the chamber 28 into a pair of subchambers which will be referred to as a filtering subchamber 52 and a backflush subchamber 54. In each of the rotated positions of the partition member 44, the filtering subchamber 52 is sealingly separated from the backflush subchamber 54, the filtering subchamber is in fluid communication with the inlet 36 and the outlet 38, and the backflush subchamber is in fluid communication with the outlet 40 and the outlet 42.

The vane means 48 and 50 assist in forming a fluid tight seal between the filtering subchamber 52 and the backflush subchamber 54. As best seen in FIGURE 2, each vane means comprises an elongated retainer 56 mounted in a vertical groove in the side edge of the partition member 44. Each retainer 56 has a slot 58 which extends substantially its full length. A pair of vanes 60 and 62 are mounted in each of the slots 58, the vane 60 preferably being formed of metal and the vane 62 being formed of a resilient material such as rubber. Each pair of vanes 60 and 62 are biased outwardly by spring means (not shown) so that their outer edges engage the chamber walls 30 and 32 when the partition member 44 is in either of its rotated positions. It is to be understood that the partition member 44 rotates about an axis that coincides with the axis of curvature of the cylindrical chamber walls 30 and 32. Each pair of vanes 60 and 62 is loosely fitted in its respective groove 58 so that the two vanes tip from side to side as the partition member 44 is rotated. As they tip, the vane edges release any dirt which they may have collected during their rotation.

Still referring to FIGURE 2, one of the retainers 56 is shown with a passage 64 connecting a pair of short passages 66 and 68 formed in opposite sides of the partition member so that the passage 64 always has one end in fluid communication with the filtering subchamber 52 and its other end in fluid communication with the filtering subchamber 54. A ball 70, which functions as a valve, is movably disposed in the passage 64 so as to assume a position adjacent one end or the other of the passage, depending on the pressure differential existing across the partition member 44. A short passage 72 connects the mid-section of the passage 64 with the vane seating groove 58 so that the pressure existing in the passage 64 is reflected in the groove 58 and behind the vanes. The pressure existing behind the vanes is always the same as the subchamber having the higher fluid pressure because the ball 70 automatically assumes a position which closes communication with the subchamber having the lesser fluid pressure and opens communication with the subchamber having the greater fluid pressure.

Now as best seen in FIGURES 1 and 2, a pair of semicylindrical filter elements 74 and 76 are supported on opposite sides of the partition member 44, and are sandwiched between a lower retainer 78 and an upper retainer 80 which are carried by the partition member 44. The lower retainer 78 rides on the bottom of the chamber 28, or it can be mounted on a suitable wear plate (not shown), if desired. An upper wear plate 82 is disposed between the upper retainer 80 and the top wall of the filter chamber 28. The upper wear plate 82 is retained against rotation with the partition member by a pin (not shown), and biased downwardly against the upper surface of the retainer 80 by a spring member 84 mounted between the top wall of the chamber 28 and the wear plate 82. The downward bias of the spring 84 against the wear plate is assisted by a clearance between the wear plate and the top wall of the chamber which allows fluid pressure to act downwardly on the wear plate.

An elongated sealing element 86 is disposed in a groove in the top wall of the chamber 28, and engages the wear plate to provide a seal between the subchambers 52 and 54 whenever the partition member is in one of its rotated positions.

It is to be noted that the two filtering elements 74 and 76 are mounted within the chamber 28 such that they collectively form a substantially cylindrical filtering means with one of the filtering elements being disposed in the filtering subchamber 52 and the other filtering element being disposed in the backflush subchamber 54 in each of the rotated positions of the partition member 54. Thus by rotating the partition member 44 180°, the two filter elements exchange their respective positions in the subchambers.

The filter element in the filtering subchamber 52 is spaced from the wall 34 and disposed such that fluid normally flows through the inlet 36, passes up and over the wall 34, and then passes radially through the filter element which collects foreign matter carried in the fluid. Thus relatively clean fluid is discharged from the filtering subchamber through the outlet 38.

Now referring to FIGURES 1 and 3, the lower end of the shaft 46 extends below the bottom of the lower housing member 18. A pneumatic cylinder 90 mounted below the housing member 18 has an internal, reciprocally mounted piston 92 with a rod member 94 connected by a link 96 to the lower end of the shaft 46. As the rod 94 is extended from the cylinder by the introduction of pneumatic pressure on one side of the piston 92, the shaft 46 is rotated in one direction, and as the rod 94 is retracted by the introduction of pneumatic air pressure on the opposite side of the piston 92, the shaft 46 is rotated in the opposite direction. The arrangement is such that the rod 94 is extended and retracted in a stroke which is sufficient to rotate the shaft 46 approximately 180° in opposite directions so that when the rod 94 is extended, the filter elements 74 and 76 exchange their relative positions in the subchambers 52 and 54, and when the rod is retracted the filter elements 74 and 76 are returned to their original positions.

The cylinder 90 is connected through a pair of conduits 98 and 100 to a source of pneumatic pressure 102 and a suitable exhaust by a conventional valve means 104 which alternately exhausts and introduces pressure to opposite sides of the piston 92 to reciprocate the piston.

Figure 3:
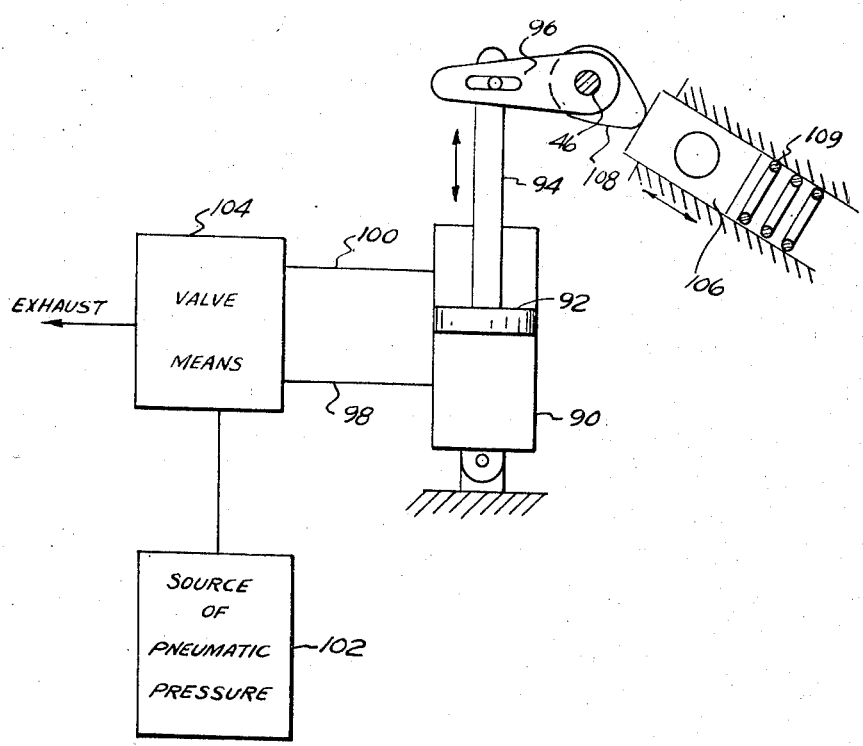
FIGURE 3 is a schematic view illustrating the linkage connecting the pneumatic cylinder and the slide valve for dumping sediment from the backflush.

Still referring to FIGURES 1 and 3, an apertured slide valve 106 is supported adjacent the outlet 40 for motion between a middle position in which it opens the outlet 40 for the removal of sediment from the subchamber 54, and a closed position in which it blocks the outlet 40. A cam 108, carried on the lower end of the shaft 46, moves the slide valve 106 against the bias of a spring 109, as the shaft 46 is initially rotated until the valve opens the outlet. The spring 109 returns the valve 106 to its closed position as the shaft completes its rotation.

Referring to FIGURE 1, an upper housing member 110, mounted on top of the lower housing member 18, supports a pressure-sensing means 112 adjacent the outlet 38 of the chamber 28. The pressure-sensing means comprises a piston 114 slidably mounted in a cylindrical chamber 116. A rod 118 carried by the piston 114 extends through a cap 120 which closes the end of the cylindrical chamber 116.

The fluid circuit 10 includes a by-pass line 122 which provides a connection between the inlet 36 of the housing 18 and a port 124 which opens into the chamber 116 behind the piston 114. Thus the pressure behind the piston 114 corresponds to the inlet fluid pressure on the upstream side of the filter element disposed in the filtering subchamber 52. The opposite side of the piston 114 is exposed to the fluid pressure on the downstream side of the filter element.

The piston 114 is movable toward and away from a position in which it abuts a stop portion 126 on the inner side of the cap 120. A spring 128 disposed in the chamber 116 biases the piston toward the cap 120. The position the piston assumes in the chamber 116 depends upon the pressure drop across the filter element 74. When the filter element in the filtering subchamber 52 is in a relatively clean condition, the piston 114 is in abutment with the stop portion 126. As the filter element in the filtering chamber collects foreign matter from the fluid, it assumes a clogged condition which produces a changing pressure drop across the filter element. This changing pressure drop is reflected across the piston 114 and moves it away from the cap 120. This piston motion is transmitted by the rod 118 to a suitable control means 130 which is connected to valve means 104 by a connection 132. The arrangement is such that as the pressure-responsive piston 114 is moved to a predetermined position associated with a predetermined clogged condition of the filter element 74, the valve means 104 causes the drive piston 92 to rotate the partition member 44 approximately 180° to move the clogged filter element from the filtering chamber 52 into the backflush chamber 54, and to move the relatively clean filter element in the backflush chamber 54 into the filtering chamber 52 without interrupting the continuity of the fluid flow through the system. The control means 130 can be any suitable connection between the piston rod 118 and the valve means 104 such as a solenoid, a mechanical connection or the like.

The upper housing member 110 has a cylindrical pressure chamber 134 connected to a second inlet 136 of the chamber 28 on the inner side of the filter element disposed in the backflush chamber 54. A piston 138 is slidably mounted in the chamber 134 for movement toward and away from the inlet 136. A spring 140 in the chamber 134 biases the piston upwardly away from the inlet 136 and toward a cap 142 which closes off the upper end of the chamber 134.

A passage 142 provides a connection between the pressure chamber 134 and the downstream side of the filter element 74. A pair of bushings 144 and 146 close off the ends of the passage 142, and provide means for retaining a ball check valve 148 in the passage. A spring 150 biases the ball check valve toward a position in which it closes the passage 142 when the fluid pressure in the chamber 134 is greater than the presure downstream of the filter element in the filtering subchamber. When the pressure in the pressure chamber 134 is lower than the fluid pressure downstream of the filtering subchamber, the ball check valve 148 opens to introduce filtered fluid into the pressure chamber 134.

The upper side of the piston 138 is connected by conduit means 152 to the source of pneumatic pressure 102. A valve means 154 in the conduit means 152 is operable to open a connection between the source of pneumatic pressure 102 and the upper side of the piston 138 so that the pneumatic pressure moves the piston 138 down against the bias of the spring 140. The arrangement is such that as the piston 138 is forced downwardly it produces a pressure surge or wave of relatively clean fluid in the pressure chamber 134. The pressure surge travels through the inlet 136, in a reverse direction through the filter element disposed in the backflush chamber 54, and toward the outlet 42. This pressure surge removes foreign matter collected on the outer side of the filter element in the filtering chamber 152, and delivers this foreign matter through the outlet 42 to a suitable receiver.

As the piston 138 moves downwardly to create the pressure surge, the fluid pressure in the pressure chamber 134 increases until it is greater than the pressure on the downstream side of the filtering subchamber so that the ball check valve 148 remains closed. At the termination of its downward stroke, the connection between the upper side of piston 138 and the source of pneumatic pressure 102 is closed and air is exhausted so that spring 140 returns the piston upwardly in its stroke. During the this return stroke, the fluid pressure in the pressure chamber 134 below the piston is reduced to a level that is lower than the fluid pressure on the downstream side of the filtering subchamber so that the ball check valve 148 opens to admit a clean charge of fluid into the pressure chamber 134.

The valve means 154 for controlling the motion of piston 138 is similar to valve means 104 in that it has a first condition for opening a conection between the source of pneumatic pressure 102 and the upper side of the piston 138, and a second condition for closing the connection between the source of pneumatic pressure and opening a connection to an exhaust to allow the piston to be returned to its upper position. The condition of the valve means 154 is controlled by a suitable connection 156 to the control means 130 such that the pressure surge from the pressure chamber 134 is produced in repsonse to a predetermined motion of the pressure-responsive piston 114.

Thus it can be seen that the piston 114 provides means for automatically detecting that the filter element in the filtering subchamber 52 has become clogged, and in response to such a condition causes the drive cylinder 90 to rotate the shaft 46 to exchange the positions of the two filter elements 74 and 76 with the clogged filter being moved to the backflush subchamber 54 and the relatively clean filter being moved into the filtering subchamber without interrupting the continuity of fluid flow through the system. The pressure-responsive piston 114 also provides means for automatically producing a pressure surge to clean the clogged filter element in the backflush subchamber 54 by actuating the piston means 138. As the filter elements exchange their relative positions, the pressure differential across the piston 114 is reduced so that the spring 128 returns the piston to its normal position. As the two filter elements are rotated, the sediment or foreign matter that has been separated from the inner side of the clogged filter element in the backflush subchamber is removed by opening the slide valve 106. The upper housing member 110 also has passage means 158 connected to the upper side of the chamber 28 and also to the pressure chamber 134 so that air may be bled from the system by opening and closing a valve 160.

What is claimed is:

1. A filter device for spearating foreign matter from a moving fluid, comprising:
   (a) housing means having internal walls forming a fluid filter chamber, an inlet for receiving fluid to be filtered into said chamber, a first outlet for the removal of filtered fluid from said chamber, and a second outlet for the removal of foreign matter, separated from the fluid, from the filter chamber;
   (b) partition means in said filter chamber engageable with the walls of the filter chamber;
   (c) support means for rotatably supporting the partition means for motion between rotated positions in which the partition means engage the walls of the filter chamber to subdivide the chamber into a first subchamber and a second subchamber, the first subchamber being in fluid connection with said inlet and the first outlet, and the second subchamber being in fluid communication with the second outlet and separated from normal fluid flow from the inlet and the first outlet by said partition means;
   (d) first and second filter elements supported in said filter chamber for motion with said partition means as it is moved between its rotated positions such that one of the filter elements is disposed in the first subchamber to collect foreign matter from fluid moving from said inlet to the first outlet, and the other of said filter elements is disposed in the second subchamber when the partition means is in a rotated position;
   (f) surge-producing means in said pressure chamber operable, upon being actuated, to produce a fluid surge through the filter element disposed in the second subchamber to remove foreign matter therefrom;
   (g) a valve member supported adjacent the second outlet for motion between a first position in which it opens the second outlet for the removal of foreign matter from the second subchamber, and a second position in which it closes the second outlet; and
   (h) a fluid actuator connected to said valve member and to said support means, said fluid actuator being movable to a first position, upon being actuated, in which it positions the partition means and the first and second filters such that one of said filters is in one of said subchambers and the other of said filters is in the other of said subchambers and the valve member is moved between its first and second positions, and a second position in which the partition means is positioned such that the first and second filters are exchanged in the subchambers.

2. The filter device as defined in claim 1, in which the housing means has a third outlet in fluid communication with the second subchamber, and the surge-producing means is operable to produce a fluid surge through the filter element in the second subchamber toward the third outlet to remove foreign matter from the filter element and to carry the foreign matter toward the third outlet.

3. The filter device as defined in claim 1, in which the housing means has a third outlet in fluid communication with the second subchamber, the surge producing means is operative to produce a fluid surge from the pressure chamber toward the third outlet, and at least one of the filter elements is movable with the partition means between a position in the first subchamber in which it collects foreign matter from fluid flowing in a first direction with respect to the filter element, and a position in the second subchamber in which it is disposed so that the fluid surge passes in the opposite direction through the filter element to remove collected foreign matter.

4. The filter device as defined in claim 1, in which the housing means has a third outlet in fluid communication with the second subchamber for the removal of foreign matter from one side of the filter element therein by the pressure surge, and including a sediment chamber below the filter element in the second subchamber for collecting sediment from the opposite side of the filter element, the sediment chamber being arranged such that as the valve member is moved toward its first position, sediment is passed from the sediment chamber.

5. The filter device as defined in claim 1, wherein said surge producing means comprises a movable piston disposed in said pressure chamber for producing the fluid surge.

6. The filter device as defined in claim 5, in which the piston in the pressure chamber is operable to produce a reverse fluid flow from the pressure chamber through the filter element in the second subchamber.

7. The filter device as defined in claim 1, in which the fluid actuator comprises a fluid cylinder means operably connected to the support means.

8. The filter device as defined in claim 1, including means for sensing a change in the filtering condition of the filter element in the first subchamber, and for actuating the fluid actuator in response to a predetermined change in the filtering condition.

9. The filter device as defined in claim 1, in which said said partition means include a partition supported in the filter chamber between said first and second filter elements, and vane means carried on the edges of said partition engageable with the walls of the filter chamber to assist in fluidly sealing the first subchamber with respect to the second subchamber at such times as the partition is in a rotated position.

10. The filter device as defined in claim 1, in which the filter chamber has sidewalls curved to form a portion of a cylinder; and the partition means includes a partition member supported for rotation about the axis of curvature of the sidewalls, and vane means carried by the partition member sealingly engageable with the sidewalls when the partition member is in its rotated positions.

11. The filter device as defined in claim 1, wherein the first and secooned filter elements each have a partially cylindrical shape, the two filter elements being mounted to collectively form a substantially cylindrical filter means.

12. The filter device as defined in claim 1, wherein the fluid actuator is operable to rotate the partition means in response to a pneumatic signal, and including signal-producing means for sensing a predetermined change in the pressure differential across the filter element in the first subchamber, and for transmitting a pneumatic signal to said fluid actuator in response to such a predetermined change.

13. The filter device as defined in claim 1, including means for introducing fluid that has passed through the filter element in the first subchamber to said pressure chamber so that the surge-producing means produces a fluid surge of relatively clean fluid through the filter element disposed in the second subchamber.

14. The filter device as defined in claim 1, in which said partition means are supported on a rotatable shaft, and including cam means connecting the shaft and the valve member to move the valve member between its first and second positions as the shaft is rotated to move the partition means between rotated positions.

15. The filter device as defined in claim 1, in which said surge-producing means comprises a piston movably supported in the pressure chamber, and means providing a connection between one side of said piston and a source of pneumatic pressure, and including means connecting the fluid actuator and the source of pneumatic pressure such that the piston produces a surge as the actuator rotates the partition means.

16. The filter device as defined in claim 1, including flange means on said housing means for mounting same on the wall of a fluid reservoir.

17. The filter device as defined in claim 1, in which said fluid actuator comprises a fluid cylinder having an extendable rod connected to the support means to move the partition means between its rotated positions as the rod is extended.

18. The filter device as defined in claim 17, including a source of pneumatic pressure, and means connecting said source to said fluid cylinder for extending the rod to rotate the partition means from a first to a second of said rotated positions, and for retracting the rod to return the partition means from the second to the first of said rotated positions.

19. The filter device as defined in claim 18 in which said surge-producing means comprises a piston disposed in said pressure chamber for a motion in which it produces a fluid surge from the pressure chamber through the second subchamber, and including means connecting one side of said piston and said source of pneumatic pressure for producing said motion.

20. A filter device for separating foreign matter from a moving fluid medium comprising:
 (a) a housing having an internal chamber, an inlet for receiving fluid into said internal chamber and an outlet for the discharge of fluid from said internal chamber;
 (b) a shaft mounted on said housing for rotation between first and second rotated positions;
 (c) a partition member on said shaft and disposed in said internal chamber for partitioning same into a plurality of subchambers when said shaft is in one of said rotated positions including a first subchamber fluidly connected with said inlet and said outlet, and a second subchamber separated from said inlet and said outlet;
 (d) a plurality of filter elements;
 (e) means for mounting a first of said filter elements on said shaft in said first subchamber intermediate said inlet and said outlet so that fluid moving through said inlet flows in a first direction through said first filter element, and a second of said filter elements on said shaft in said second subchamber;
 (f) fluid cylinder means having an extendable rod connected with said shaft, the rod being movable in a first motion in which it rotates the shaft from the first rotated position to the second rotated position, to exchange the position of the first and second filter elements in said subchambers;
 (g) means providing a pressure chamber fluidly connected with the second subchamber; and
 (h) piston means in said pressure chamber operative to produce a fluid flow from said pressure chamber through the filter element disposed in said subchamber.

21. The filter device as defined in claim 20, including means for introducing fluid from said first subchamber into said pressure chamber.

22. The invention as defined in claim 20, including a source of pneumatic pressure, and means providing a connection between said source and said pressure chamber to move said piston means to produce a fluid surge from the pressure chamber through the filter element disposed in the second subchamber.

References Cited

UNITED STATES PATENTS

| | | | |
|---|---|---|---|
| 3,425,557 | 2/1969 | Rosaen | 210—333 X |
| 3,425,558 | 2/1969 | Rosaen | 210—333 X |

REUBEN FRIEDMAN, Primary Examiner

FRANK A. SPEAR, Jr., Assistant Examiner

U.S. Cl. X.R.

210—330, 333, 411

PO-1050
(5/69)

UNITED STATES PATENT OFFICE
CERTIFICATE OF CORRECTION

Patent No. 3,493,113          Dated 2-3-70

Inventor(s) N. O. Rosaen

It is certified that error appears in the above-identified patent and that said Letters Patent are hereby corrected as shown below:

Col. 1, line 52, change "was" to --is--;

Col. 2, line 63, "aforementioned copending application" should be --aforementioned patent--;

Col. 3, line 20, after "backflush" insert --chamber--;

Col. 6, line 49, after "its" insert --return--;

Col. 6, line 58, "conection" should be --connection--;

Col. 6, line 66, "repsonse" should be --response--;

Col. 7, line 19, "spearating" should be --separating--;

Col. 7, line 34, "connection" should be --communication

Col. 8, line 40, delete "said";

Col. 8, line 55, change "secoond" to --second--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents